L. L. WARR.
TIRE PROTECTOR.
APPLICATION FILED SEPT. 22, 1915.
1,200,671. Patented Oct. 10, 1916.
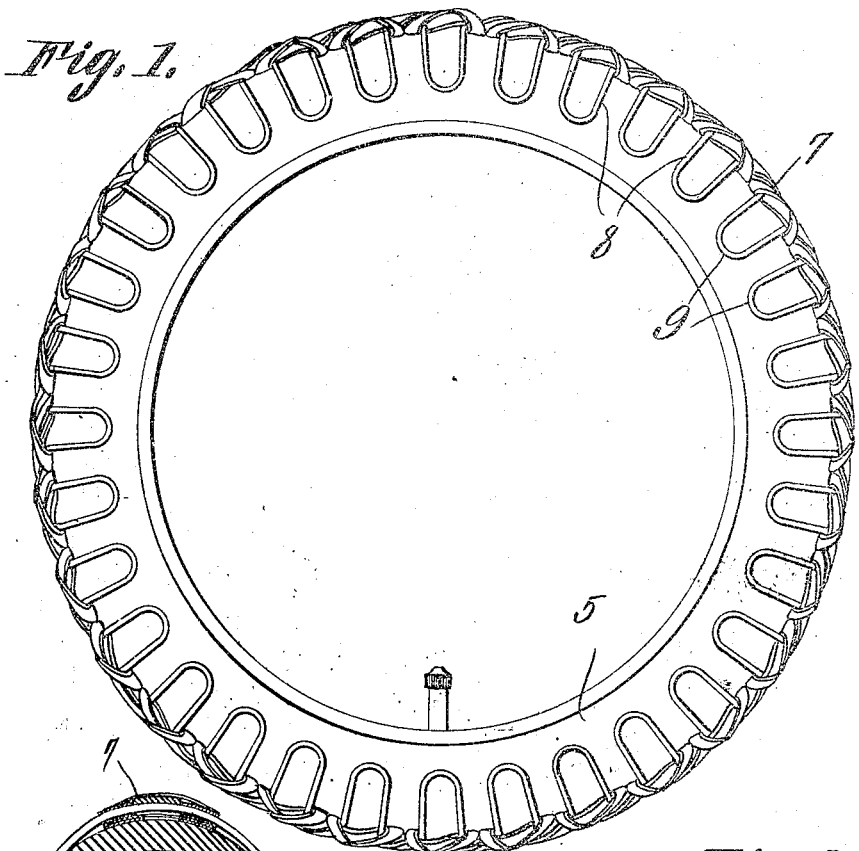
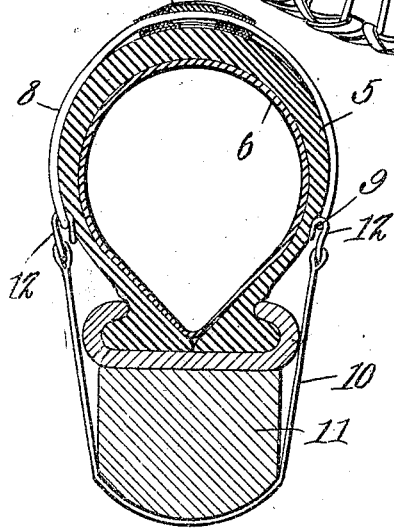
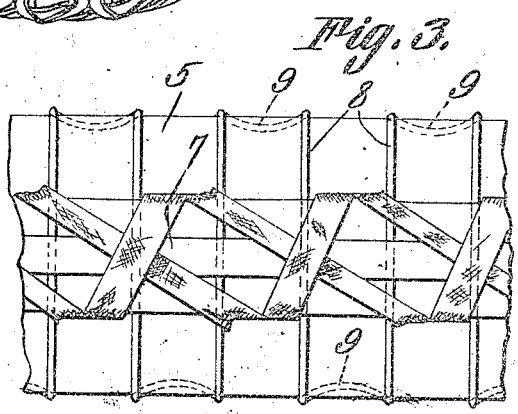
Inventor
Lionel L. Warr
Attorneys

UNITED STATES PATENT OFFICE.

LIONEL L. WARR, OF MALDEN, MASSACHUSETTS.

TIRE-PROTECTOR.

1,200,671.

Specification of Letters Patent. Patented Oct. 10, 1916.

Application filed September 22, 1915. Serial No. 52,021.

*To all whom it may concern:*

Be it known that I, LIONEL L. WARR, a citizen of the United States of America, residing at 91 Clifton street, Malden, in the county of Middlesex and State of Massachusetts, have invented certain new and useful Improvements in Tire-Protectors, of which the following is a specification.

This invention relates to anti-skid attachments for pneumatic tires, and its object is to provide a simple and efficient device of this kind which can be readily attached to the tire, and which also serves as an armor to protect the outer casing of the tire from being cut, thus minimizing the liability of punctures and blow outs.

With the object stated in view, the invention consists in a novel combination and arrangement of parts to be hereinafter described and claimed, and in order that the same may be better understood, reference is had to the accompanying drawing in which—

Figure 1 is an elevation of a tire showing the application of the invention; Fig. 2 is a cross section of the tire showing a modification, and Fig. 3 is a plan view of a fragment of the tire.

Referring specifically to the drawing 5 denotes the outer casing of an ordinary pneumatic tire, provided with an inner tube 6 as usual.

The device which is the subject matter of the present application for patent comprises an anti-skid shoe and armor mounted on the tread portion of the tire casing 5 and completely encircling the same. The shoe is composed of series of longitudinal fabric strips 7 interwoven with an open-work metallic structure curved transversely to fit the tire and extending circumferentially around the same. This metallic structure is a single piece of wire which is bent into a sinuous shape to form laterally spaced, transverse cross bars 8 connected in alternate order at their ends by bends 9. The cross bars 8 are curved to correspond to the transverse curvature of the casing 5, and they extend across the tread and for some distance over the sides of the casing. The fabric strips 7 are interwoven with the cross bar 8 midway between the ends of the latter so that they form a tread when the device is on the tire.

The strips 7 are interwoven with the cross bars 8 so that a roughened tread is produced which effectually prevents skidding. This tread also protects the tire casing and the sides of the latter are protected by the side and end portions of the cross bars 8 and their connecting bends.

The device is frictionally held on the tire after inflating the same, it being put on while the tire is deflated. The wire members 8 are resilient and their tendency is to spring inward, in view of which they securely grip the tire when the same is inflated. If desired a suitable anchoring means may be provided, an example of which is shown in Fig. 2, the same comprising a strap 10 extending under the rim 11 of the wheel and having hooks 12 which are connected to the bends 9. Any suitable number of these or other anchoring devices may be provided.

The device will hold old and ragged tire casings together, and when applied to a new casing it will materially lengthen the life thereof.

I claim:

A tire protector comprising an openwork metallic structure extending circumferentially around the tire, and composed of laterally spaced cross wires curved to conform to the transverse curvature of the tire, said cross wires extending across the tread of the tire and for a distance over the sides thereof, and being resilient to grip the sides of the tire, adjacent ones of said wires being connected at the sides of the tire, and a tread composed of fabric strips interwoven with the cross wires at the tread of the tire.

In testimony whereof I affix my signature in presence of two witnesses.

LIONEL L. WARR.

Witnesses:
JOHN R. WARR,
HELEN M. MAGNER.